(12) United States Patent
Dumitru et al.

(10) Patent No.: US 10,543,876 B2
(45) Date of Patent: Jan. 28, 2020

(54) TRACK SUPPORT RAIL FOR SUPPORTING TRACK ASSEMBLY OF MACHINE, TRACK SUPPORT ASSEMBLY, AND METHOD OF USING SAME

(71) Applicant: Caterpillar Inc., Peoria, IL (US)

(72) Inventors: Mircea Dumitru, Washington, IL (US); Benoit Abello, Dunlap, IL (US); Ben Pulley, Oak Creek, WI (US)

(73) Assignee: Caterpillar Inc., Peoria, IL (US)

( * ) Notice: Subject to any disclaimer, the term of this patent is extended or adjusted under 35 U.S.C. 154(b) by 393 days.

(21) Appl. No.: 15/380,731

(22) Filed: Dec. 15, 2016

(65) Prior Publication Data

US 2018/0170463 A1 Jun. 21, 2018

(51) Int. Cl.
| | |
|---|---|
| *B62D 55/084* | (2006.01) |
| *B62D 55/10* | (2006.01) |
| *B62D 55/32* | (2006.01) |
| B62D 55/06 | (2006.01) |
| E02F 3/30 | (2006.01) |

(52) U.S. Cl.
CPC ......... *B62D 55/0845* (2013.01); *B62D 55/10* (2013.01); *B62D 55/32* (2013.01); *B62D 55/06* (2013.01); *E02F 3/308* (2013.01)

(58) Field of Classification Search
CPC .... B62D 55/08; B62D 55/10; B62D 55/0845; B62D 55/14; B62D 55/32
See application file for complete search history.

(56) References Cited

U.S. PATENT DOCUMENTS

| | | | |
|---|---|---|---|
| 3,857,616 A | 12/1974 | Tucker et al. | |
| 4,229,053 A | 10/1980 | Cline | |
| 5,139,317 A | 8/1992 | Larson et al. | |
| 5,941,326 A | 8/1999 | Fleuchaus | |
| 9,352,793 B2 | 5/2016 | Vitas et al. | |
| 9,434,428 B2 | 9/2016 | Hakes et al. | |
| 2002/0070606 A1 | 6/2002 | Poetter | |
| 2005/0040706 A1* | 2/2005 | Yamamoto | B62D 55/0882 305/139 |

(Continued)

FOREIGN PATENT DOCUMENTS

| | | |
|---|---|---|
| CN | 2606043 Y | 3/2004 |
| CN | 204279681 U | 4/2015 |
| JP | 2012-144141 A | 8/2012 |

*Primary Examiner* — Jason R Bellinger
(74) *Attorney, Agent, or Firm* — Leydig, Voit & Mayer, LTD.

(57) ABSTRACT

A track support rail for slidably supporting a track assembly of a machine includes a body having a first body end, a second body end, a crown portion, and an upper support surface. The body extends along a longitudinal axis between the first and second body ends. The crown portion is disposed between the first and second body ends along the longitudinal axis. The upper support surface extends along the longitudinal axis between the first and second body ends. The upper support surface includes first and second curved segments. The first curved segment has a first curved shape and extends from the first body end toward the crown portion of the body. The second curved segment has a second curved shape and extends from the second body end toward the crown portion of the body. The first curved shape is different from the second curved shape.

18 Claims, 10 Drawing Sheets

(56) References Cited

U.S. PATENT DOCUMENTS

| | | |
|---|---|---|
| 2010/0139993 A1 | 6/2010 | Sebright et al. |
| 2012/0121320 A1 | 5/2012 | Abello et al. |
| 2013/0000995 A1 | 1/2013 | Dumitru et al. |
| 2014/0265548 A1 | 9/2014 | Vitas et al. |
| 2015/0130268 A1* | 5/2015 | Scheuerman .......... B62D 55/15 305/116 |
| 2015/0344088 A1 | 12/2015 | Hakes et al. |
| 2015/0353152 A1 | 12/2015 | Hakes et al. |

* cited by examiner

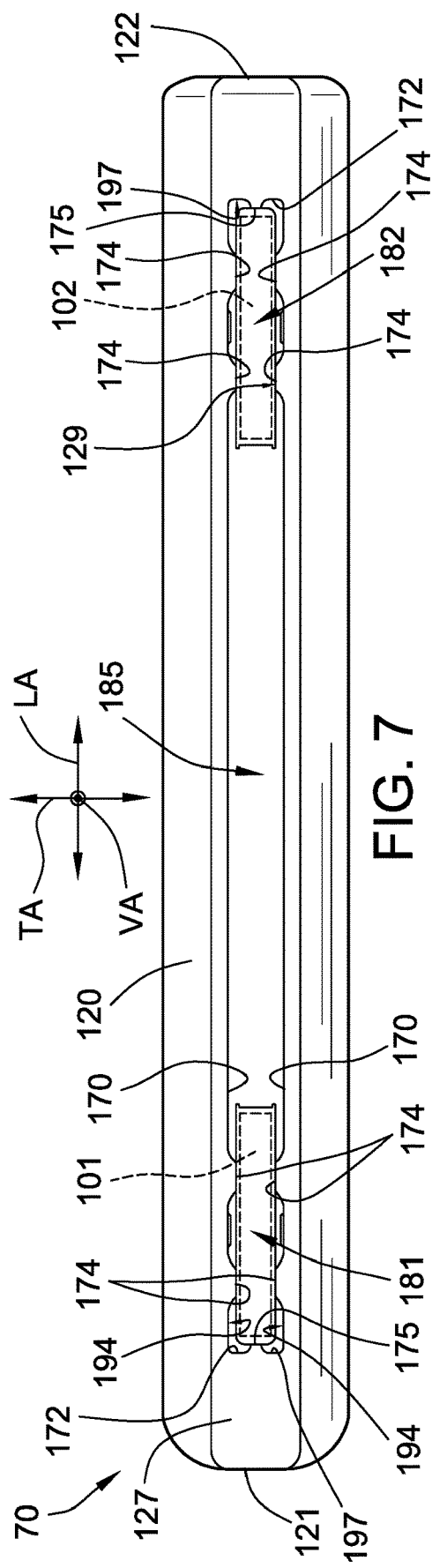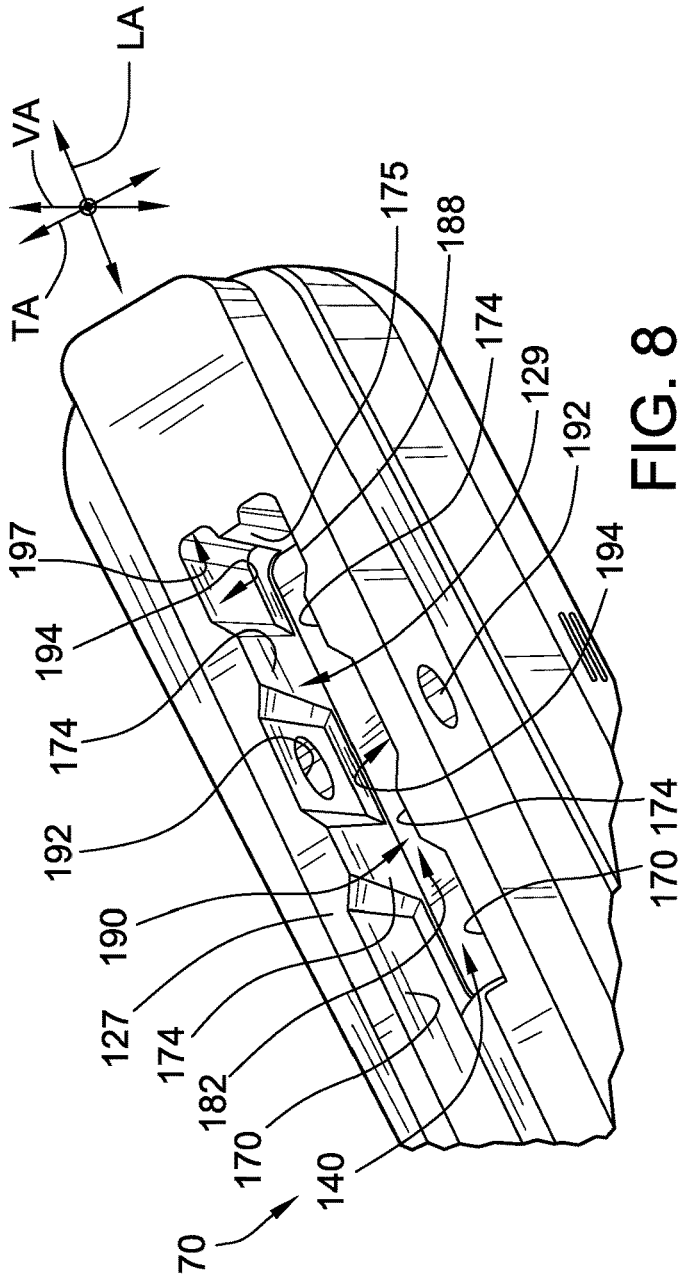

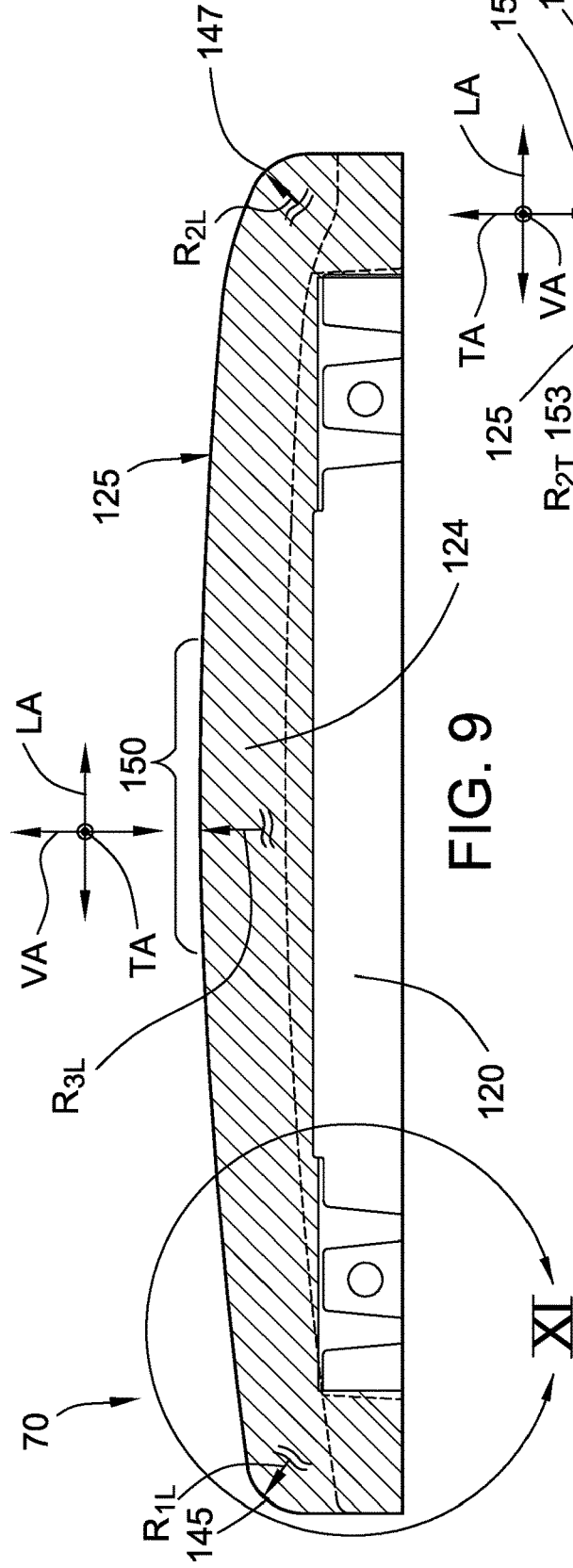
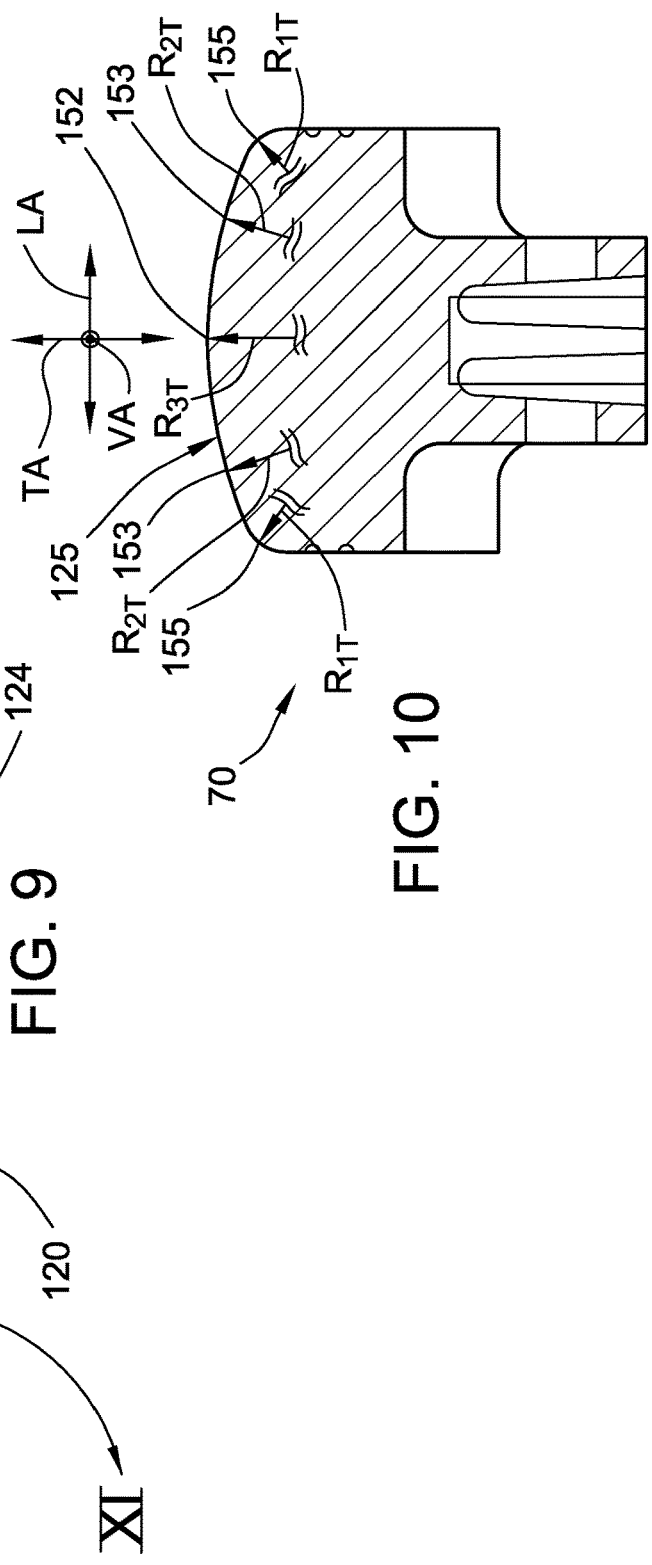
FIG. 9
FIG. 10

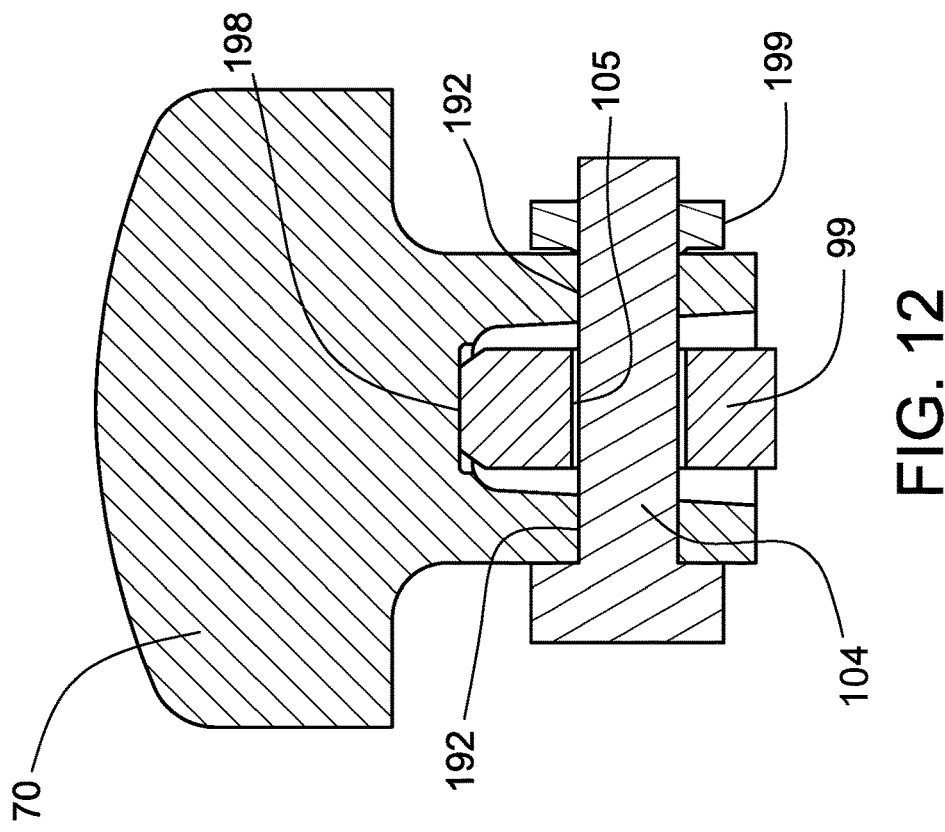
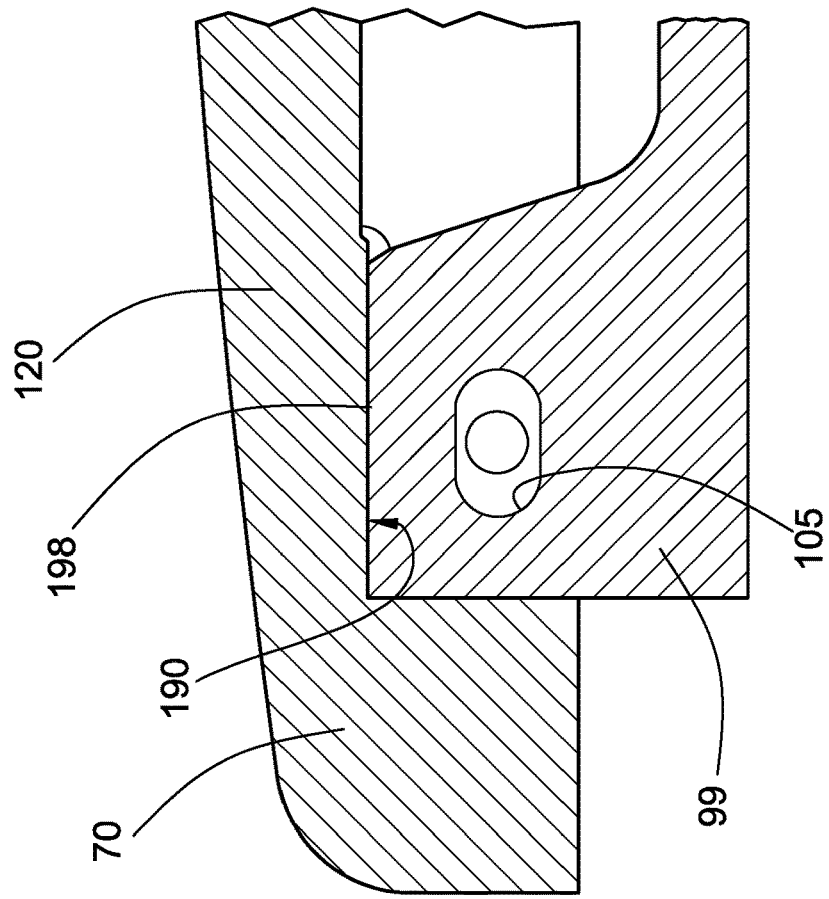
FIG. 12
FIG. 11

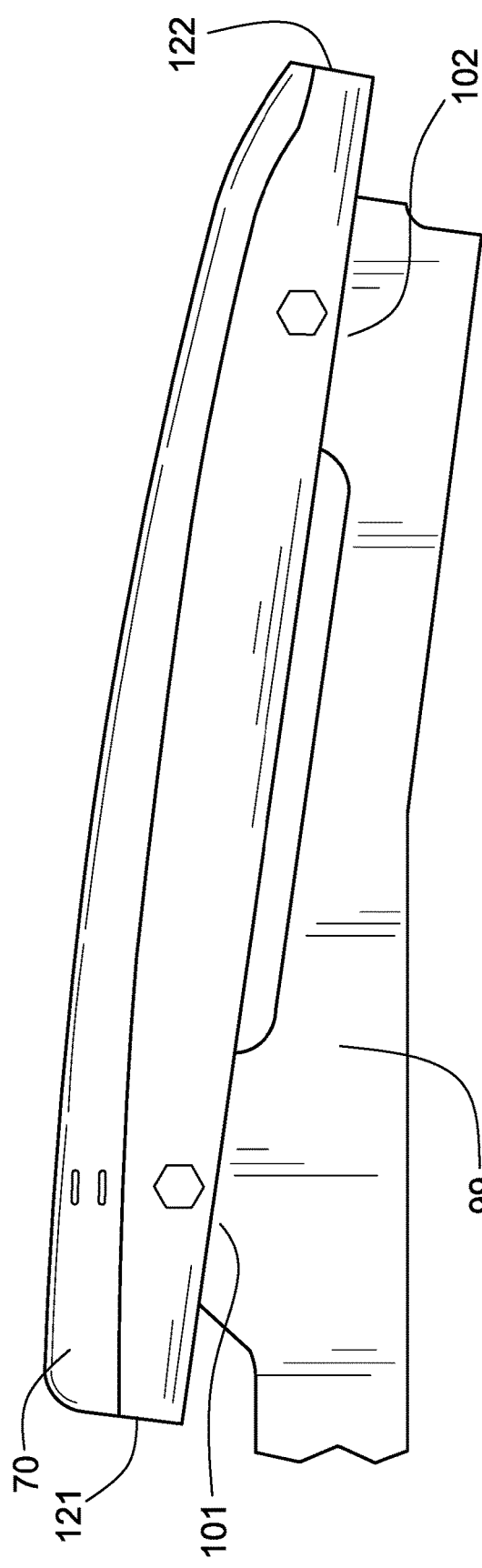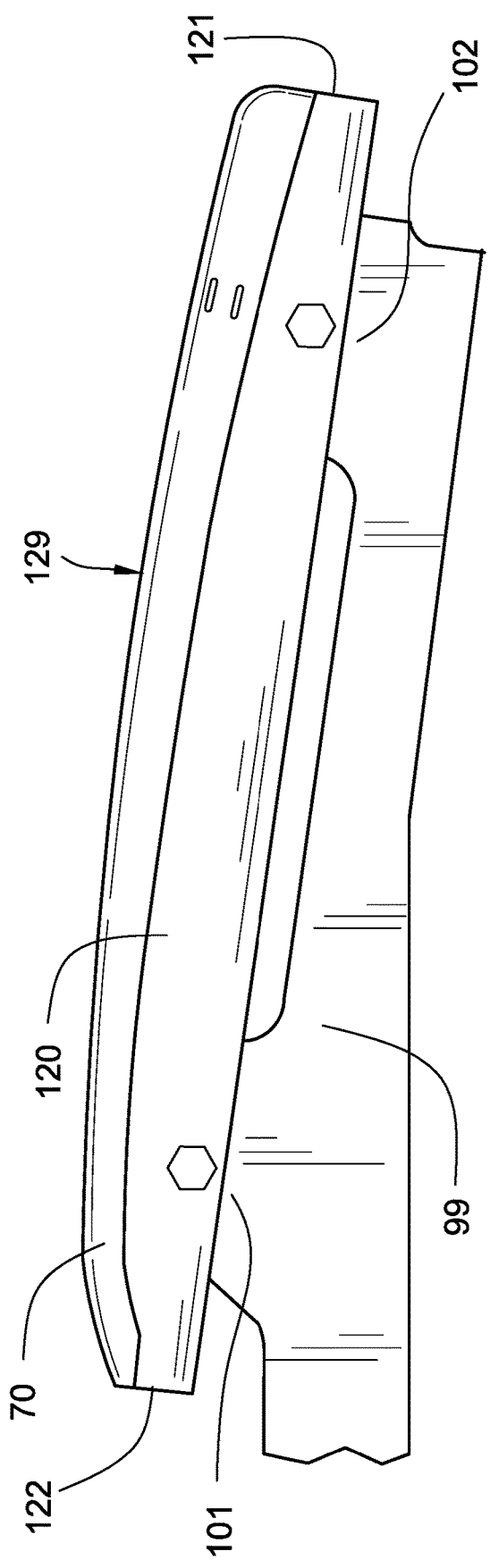
FIG. 13
FIG. 14

TRACK SUPPORT RAIL FOR SUPPORTING TRACK ASSEMBLY OF MACHINE, TRACK SUPPORT ASSEMBLY, AND METHOD OF USING SAME

TECHNICAL FIELD

This patent disclosure relates generally to a track assembly for a track-type machine and, more particularly, to a track support rail, or slider, for use in a track support assembly of the machine.

BACKGROUND

Track-type machines are in widespread use in construction, mining, forestry, and other similar industries. The undercarriage of such track-type machines utilizes track assemblies, rather than wheels, to provide ground-engaging propulsion. Such track assemblies may be preferred in environments where creating sufficient traction is problematic, such as those frequently found in the industries identified above. Specifically, rather than rolling across a work surface on wheels, track-type machines utilize one or more track assemblies that include an endless loop of coupled track links defining outer surfaces, which support ground-engaging track shoes, and inner surfaces that travel about one or more track-engaging elements, such as, drive sprockets, idlers, tensioners, and rollers, for example.

Excavating equipment, including rope shovels, excavators, and the like, can include a plurality of track support rails, often called "sliders," that support the track assembly along an upper portion of the track assembly's loop around a drive sprocket, or tumbler, and an idler. In its movement along a substantially horizontal path above the ground, the track assembly slides over the supporting track support rails or "sliders" as the track is driven in a loop about the drive sprocket. The components of the track assembly, along with rock and soil that become entrained in the moving track assembly, can subject the sliders to relatively high abrasive wear rates.

Conventionally, the sliders are welded to the track support frame. Accordingly, when a slider is replaced after experiencing excessive wear, the worn slider is cut away from a support frame (such as, by using an arc cutter, for example) and a replacement slider is welded to the frame in its place. The original fabrication of the support frame with integral sliders can be complicated and costly. Furthermore, the replacement of a worn slider that is integral with the support frame is a labor-intensive process.

U.S. Pat. No. 5,941,326 is entitled, "Guide Rail for a Crawler Track," and is directed to a crawler track guide rail having an upper elongated surface engageable with the shoes of a crawler track, a lower surface engageable with a crawler track support frame, and a foot which extends downward into the frame to transfer load resulting from the engagement of the shoes with the guide rail to the frame. The guide rail has at least one elongated lower surface and may have two elongated lower surfaces which are engageable with the frame. Where there are two elongated surfaces of the guide rail in engagement with the frame, the foot of the guide rail is positioned between the two elongated surfaces. The guide rail has a plurality of fasteners for retaining it on the crawler frame extending through the guide rail and the frame. The fasteners have a selected tolerance fit with the frame, and the foot of the guide rail has a smaller tolerance fit with the frame than that of the fasteners. Thus, the foot fits relatively snugly with the frame to thereby assist with transfer of the load on the guide rail to the frame through the foot rather than through the fastener members.

There is a continued need in the art to provide additional solutions for undercarriages with a track assembly. For example, there is a continued need for a slider for supporting a track assembly which is not only sufficiently strong to support the service loads for which it is intended, but also extremely durable to provide a slider with an extended useful life. Furthermore, there is a continued need for a slider for supporting a track assembly which is easy to replace when its service life has expired.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes a track support rail for supporting a track assembly of a machine. The track assembly is slidably movable over the track support rail.

The track support includes a body having a first body end, a second body end, a crown portion, and an upper support surface. The body extends along a longitudinal axis between the first body end and the second body end. The crown portion is disposed between the first body end and the second body end along the longitudinal axis. The upper support surface extends along the longitudinal axis between the first body end and the second body end.

The upper support surface includes a first curved segment and a second curved segment. The first curved segment has a first curved shape and extends from the first body end toward the crown portion of the body. The second curved segment has a second curved shape and extends from the second body end toward the crown portion of the body. The first curved shape is different from the second curved shape.

In another embodiment, a track support assembly for supporting a track assembly of a machine includes a support frame and a track support rail. The support frame includes a drive end and an idler end. The support frame extends along a longitudinal axis between the drive end and the idler end. The support frame includes a mounting fin projecting therefrom along a vertical axis. The vertical axis is perpendicular to the longitudinal axis.

The track support rail is for contactingly engaging the track assembly such that the track assembly is slidably movable over the track support rail. The track support rail includes a body. The body of the track support rail is mounted to the mounting fin of the support frame. The body includes a first body end, a second body end, a crown portion, and an upper support surface. The body extends along the longitudinal axis between the first body end and the second body end. The crown portion is disposed between the first body end and the second body end along the longitudinal axis. The upper support surface extends along the longitudinal axis between the first body end and the second body end. The upper support surface is curved from the first body end toward the crown portion and from the second body end toward the crown portion. The first body end and the second body end are asymmetric with respect to each other.

In yet another embodiment, a method of using a track support assembly of a machine is described. The method includes removing a track support rail mounted in a first mounting position to a support frame. The support frame includes a drive end and an idler end. The support frame extends along a longitudinal axis between the drive end and the idler end. The track support rail includes a first body end and a second body end. The first body end of the track support rail is closer to the idler end than the second body end is when the track support rail is in the first mounting position.

The track support rail is remounted in a second mounting position to the support frame. The second body end of the track support rail is closer to the idler end than the first body end is when the track support rail is in the second mounting position.

Further and alternative aspects and features of the disclosed principles will be appreciated from the following detailed description and the accompanying drawings. As will be appreciated, the principles related to track support rails, track support assemblies for supporting a track assembly of a machine, and methods of using a track support assembly of a machine disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 7 is a bottom plan view of the slider of FIG. 4

FIG. 8 is enlarged, fragmentary perspective view of the slider of FIG. 4, illustrating a portion of a mounting pocket defined by the slider.

FIG. 9 is a cross-sectional view, taken along line IX-IX in FIG. 5, of the slider of FIG. 4.

FIG. 10 is a cross-sectional view, taken along line X-X in FIG. 6, of the slider of FIG. 4.

FIG. 11 is a fragmentary sectional view as in FIG. 9 of the slider of FIG. 4, illustrating a mounting arrangement of the slider to the track support frame.

FIG. 12 is a view as in FIG. 12 of the slider of FIG. 4, illustrating a mounting arrangement of the slider to the track support frame.

FIG. 13 is a view similar to FIG. 3 of an embodiment of a slider constructed according to principles of the present disclosure, illustrating a first body end thereof being in a worn condition and the track support rail being mounted in a first position to the support frame.

FIG. 14 is a view as in FIG. 13, but illustrating the slider of FIG. 13 mounted in a second mounting position in which the position of the first body end of the slider has been reversed relative to its position when the slider is in the first mounting position.

Figure 1:
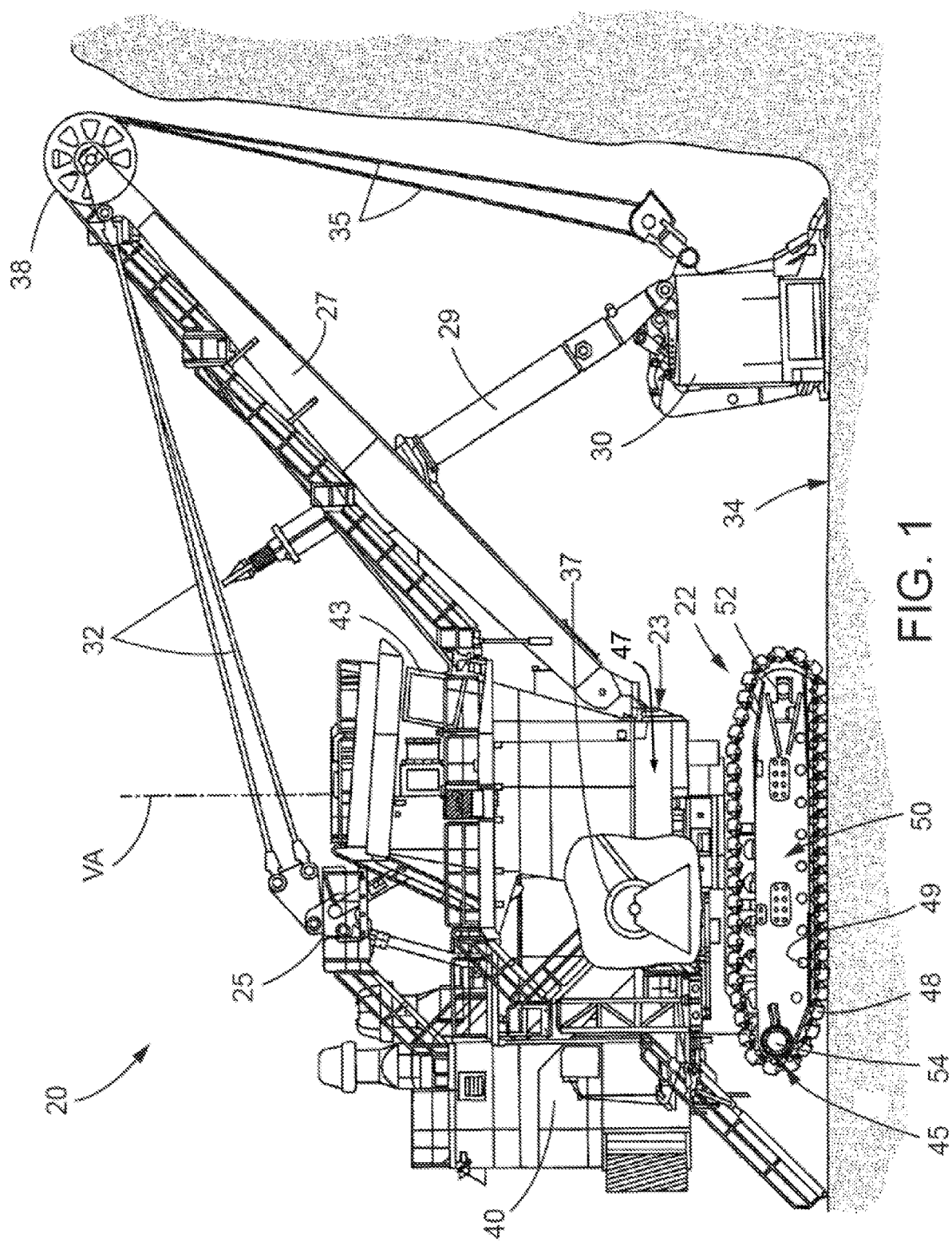
FIG. 1 is a diagrammatic side elevational view of an embodiment of an excavating machine in the form of a rope shovel which includes an undercarriage suitable for including an embodiment of a track support assembly constructed in accordance with principles of the present disclosure.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

The present disclosure provides various embodiments of a track support rail for supporting a track assembly of a track-type machine. Examples of track-type machines include machines used for construction, mining, forestry, and other similar industries, such as a dozer, loader, or any other on-highway or off-highway vehicle having a track-type undercarriage. The undercarriage can include track chain assemblies adapted to engage the ground, or other surface, to propel the track-type machine. In some embodiments, the machine can be an excavator, such as the type commonly referred to as a rope shovel.

Embodiments of a track support rail constructed according to principles of the present disclosure can include a curved support surface. In embodiments, the curved support surface of a track support rail constructed according to principles of the present disclosure can have an asymmetric configuration along its longitudinal axis. In embodiments, the asymmetric shape of the curved support surface can be configured to place more wear material at one or more specific locations along the body of the track support rail at which increased wear (relative to at least one other location along the slider) is expected to occur based upon its intended use. In embodiments, a track support rail constructed according to principles of the present disclosure can have a body with a curved support surface having a configuration that is adapted to reduce contact pressure between the support surface and the track assembly it is supporting to help reduce wear and increase the useful life of the track support rail.

Embodiments of a track support assembly for supporting a track assembly of a machine following principles of the present disclosure can include an embodiment of a track support rail constructed according to principles of the present disclosure and a support frame. In embodiments, the track support rail can be mounted to the support frame via a connection that does not include a weldment. In embodiments, having a no-weld installation for the track support rail can help facilitate assembling and maintaining the track support assembly.

In embodiments, the track support rail can have a mounting configuration that is adapted to place the track support rail in direct contacting engagement with the support frame (such as a mounting fin of the support frame). In embodiments, the track support rail rests upon the support frame such that mounting bolts extending through both the track support rail and the support frame to help retain the track support rail in place on the support frame are not subjected to a significant shear load.

Embodiments of a method of using a track support assembly of a machine following principles of the present disclosure can include constructing a track support rail according to principles of the present disclosure such that the track support rail has a reversible mounting configuration. The track support rail can experience uneven wear during its operation. In embodiments, after a periodic inspection of the track support rail reveals that a portion of the slider has experienced wear that is considered to be excessive, the slider can be removed from the support rail to which it is mounted in a first mounting position to a support frame, flipped end-for-end, and remounted in a second mounting position to the support frame. In embodiments, the reversible mounting configuration of the track support rail can provide an extended wear life for the slider relative to a slider that can only be mounted to the support frame in one orientation but is otherwise the same.

Turning now to the Figures, there is shown in FIG. 1 an exemplary embodiment of a machine 20 with a track-type undercarriage 22. The machine 20 may also be referenced herein as a track-type machine. In other embodiments, the machine 20 may be any suitable machine with a track-type undercarriage, such as, any suitable excavator, for example.

In the illustrated embodiment, the machine 20 is in the form of a power shovel known as a rope shovel which can be used to remove large amounts of material during a mining operation. The machine 20 includes the track-type undercarriage 22, a frame 23 operatively connected to the undercarriage 22, a gantry 25 (also referred to as an A-frame) connected to a top side of the frame 23 in opposing relationship to the undercarriage 22, a boom 27 pivotally connected to a front end of the frame 23, a dipper handle 29 pivotally connected to an intermediate point of the boom 27, and an implement 30 (such as, a dipper or shovel bucket, for example) pivotally connected to a distal end of the dipper handle 29.

Suitable cabling, or boom ropes 32, span between the gantry 25 and the boom 27. The boom ropes 32 can be manipulated to vary the angle at which the boom 27 is disposed relative to a work surface 34, or ground.

Cables, or tool ropes 35, extend from a hoist drum 37 housed within the frame 23 over a pulley 38 at a distal end of the boom 27 to a connection point upon the implement 30. The tool ropes 35 are reeled in or spooled out by a suitable motor assembly (not shown) connected to the hoist drum 37 to selectively raise and lower the implement 30. The motor assembly of the hoist drum 37 can be operated via a power source 40 (e.g., a combustion engine) housed within the frame 23. In embodiments, the dipper handle 29 can have a telescoping configuration that can be used to selectively extend or retract the length of the dipper handle 29 to provide further controllability of the manipulation of the implement 30.

The frame 23 is mounted for rotatable movement about a vertical axis VA with respect to the undercarriage 22. As the frame 23 pivots about the vertical axis VA, the implement 30 correspondingly changes its radial position about the vertical axis VA via its connection to the dipper handle 29 which is mounted to the frame 23 via the boom 27.

The frame 23 can house, among other things, the power source 40 and the hoist drum 37. The power source 40 can be used to selectively: operate the hoist drum 37 to manipulate the implement 30, pivot the frame 23 with respect to the undercarriage 22 about the vertical axis VA, and operate the undercarriage 22 to move the machine 20 along the work surface 34.

In the illustrated embodiment, an operator cab 43 is mounted on top of the frame 23. A suitable operator station can be housed within the operator cab 43 that can be adapted to manipulate the implement 30 and to selectively move the machine 20 about the vertical axis VA and/or along the work surface 34 via the undercarriage 22.

The track-type undercarriage 22 supports the machine 20 on the work surface 34, and includes a first track assembly 45 disposed on a first side 47 thereof, and a second track assembly (not shown) disposed on a second side thereof which is in opposing relationship to the first side. Together, the track assemblies are adapted to engage the ground, or other surface, to propel the machine 20.

It should be appreciated that the track assemblies of the machine 20 may be similar and, further, may represent mirror images of one another. As such, only the first track assembly 45 will be described herein. It should be understood that the description of the first track assembly 45 is applicable to the second track assembly, as well.

The track assembly 45 comprises an endless loop formed from a plurality of ground-engaging track shoes 48 for engaging the ground, or other surface, and propelling the machine 20. The first track assembly 45 extends about a plurality of rolling elements such as a series of idler rollers 49 supported at the bottom of a track support assembly 50 that can also include an idler sprocket 52, or tumbler, rotatably mounted thereto above the ground 34 at a front end of the undercarriage 22, and a drive sprocket 54, or tumbler, rotatably mounted thereto above the ground 34 at a rear end of the undercarriage 22. The track support assembly 50 can include a series of track support rails 55, 70, or sliders, supported at the top of the track support assembly 50 over which the track assembly 45 passes to move the machine 20 over the ground 34, including at least one track support rail constructed according to principles of the present disclosure (see FIG. 2).

The drive sprocket 54 is operatively connected to the power source 40 via a suitable transmission assembly (not shown) of the machine 20. The transmission assembly is adapted to selectively engage and drive the drive sprockets 54 respectively associated with the first and second track assemblies 45 to move the machine 20 forward and backward as necessary to perform operations at the work site.

While the machine 20 is illustrated in the context of a track-type machine shown as a rope shovel, it should be appreciated that the present disclosure is not thereby limited, and that a wide variety of other machines having tracks are also contemplated within the present context. In other embodiments, the slider guide rail can be included in any suitable track system, including one employed in a stationary machine or in any other application known to those skilled in the art.

Figure 2:
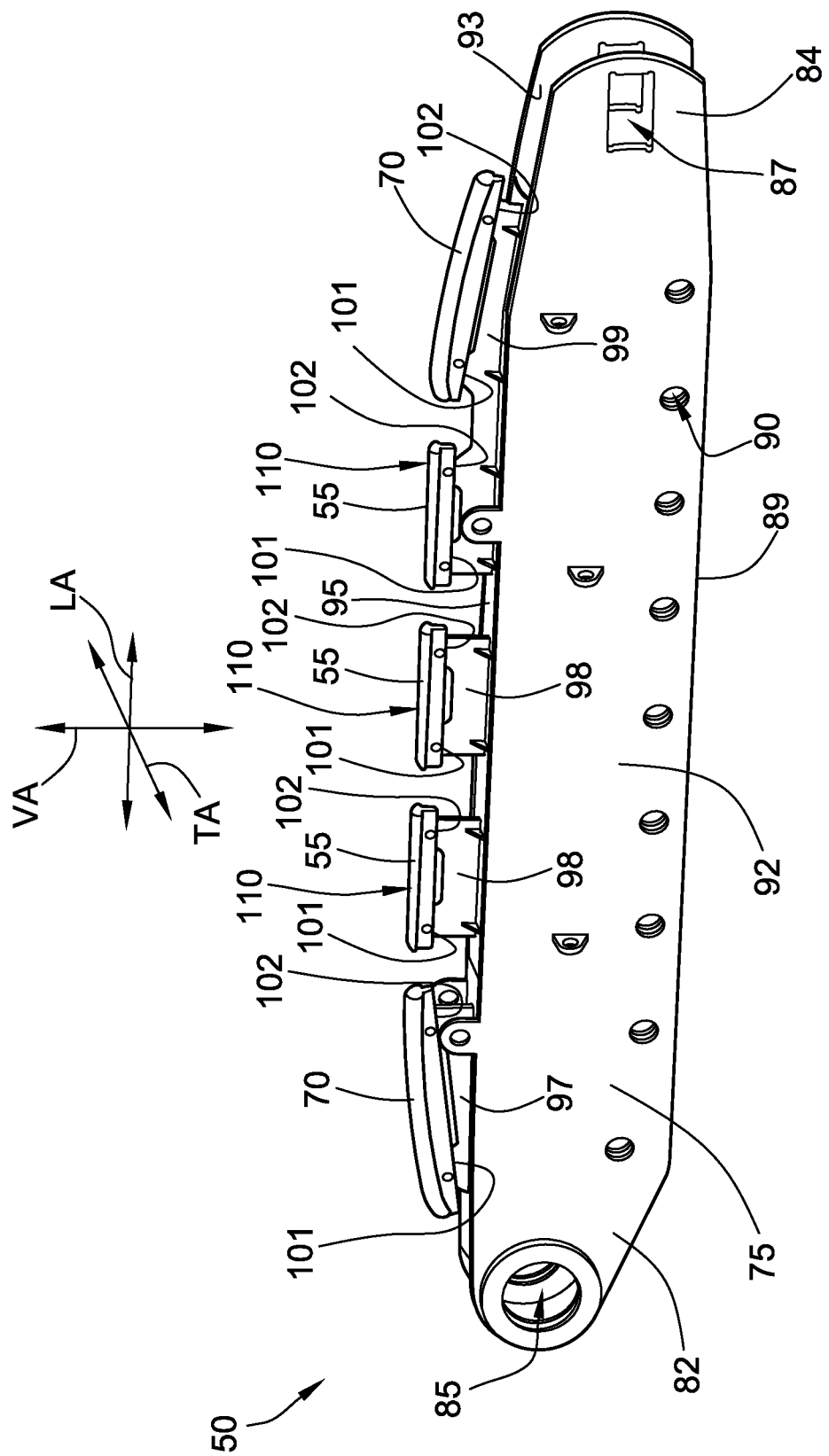
FIG. 2 is a perspective view of an embodiment of a track support assembly constructed in accordance with principles of the present disclosure.

Referring now to FIG. 2, the track support assembly 50 is adapted for supporting the track assembly 45 of the machine 20. In embodiments, the track support assembly 50 includes a support frame 75 and at least one track support rail 70 constructed according to principles of the present disclosure. In the illustrated embodiment, the track support assembly 50 includes the support frame 75; a pair of track support rails 70 constructed according to principles of the present disclosure, or end sliders 70; and three center track support rails 55, or center sliders, which are interposed between the end sliders 70. The track support rails 55, 70 are removably mounted to the support frame 75 (via a weld-free connection in at least some embodiments) to slidably support the track assembly 45 as it moves about the support frame 75 in response to the driving force of the drive sprocket 54.

In the illustrated embodiment, the three center sliders 55 are substantially the same, and the two end sliders 70 are substantially the same. In other embodiments, at least one of the center sliders 55 can be different from at least one other of the center sliders 55. In other embodiments, the end sliders 70 can be different from each other.

The support frame 75 includes a drive end 82 and an idler end 84. The support frame 75 extends along a longitudinal axis LA between the drive end 82 and the idler end 84. The drive sprocket 54 can be mounted within a first tumbler opening 85 defined in the drive end 82 of the support frame 75. The idler sprocket 52 can be mounted within a second tumbler opening 87 defined in the idler end 84 of the support frame 75. Along a lower edge 89 thereof, the support frame 75 also defines a plurality of roller openings 90 for housing a respective one of the idler rollers 49 therein.

In embodiments, the support frame 75 can be formed by a pair of frame side plates 92, 93 in lateral spaced relationship to each other along a transverse axis TA. The transverse axis TA is perpendicular to both the longitudinal axis LA and the vertical axis VA. In embodiments, the frame side plates 92, 93 can be connected together via a frame top plate 95 and a bottom plate (not shown) and/or other transverse structural member(s) extending along the transverse axis TA between the frame side plates 92, 93.

The support frame 75 includes a plurality of mounting fins 97, 98, 99 projecting from a top of the support frame 75, which is formed by the frame top plate 95 in the illustrated embodiment, along the vertical axis VA. The vertical axis VA is perpendicular to the longitudinal axis LA. The mounting fins 97 are configured to serve as the mounts for the track support rails 55, 70 which can be removably connected thereto. Each of the mounting fins 97, 98, 99 includes a first fin portion 101 and a second fin portion 102 in spaced relationship to the first fin portion 101 along the longitudinal axis LA which serves as connection points for a respective one of the sliders 55, 70. In embodiments, any suitable technique for removably mounting the track support rails 55, 70 to the mounting fins 97, 99, 98 can be used. For example, in the illustrated embodiment, each track support rail 55, 70 is removably attached to one of the mounting fins 98, 97, 99 via a pair of fasteners 104 (see FIG. 3).

Figure 3:
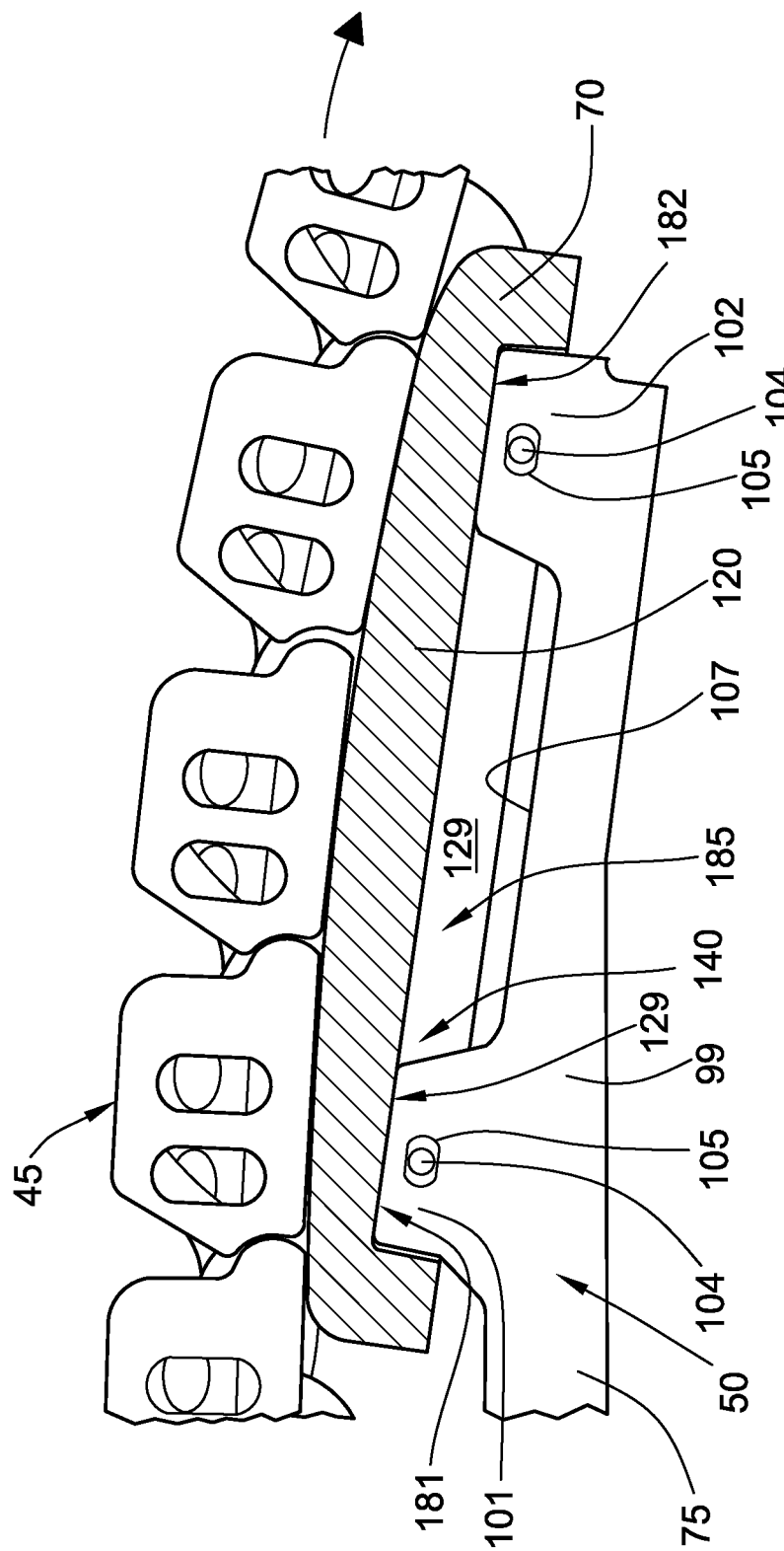
FIG. 3 is an enlarged, fragmentary perspective view of the track support assembly of FIG. 2, illustrating a track assembly supported thereon.

Referring to FIG. 3, each of the first and second fin portions 101, 102 of the illustrated embodiment is in the form of a mounting tab which defines a fin opening 105 therethrough. In embodiments, each fin opening 105 is configured to receive the fastener 104 therethrough for connecting a respective one of the track support rails 70 to the particular mounting fin 99. The illustrated fin opening 105 is in the form of an elongated slot. In other embodiments, a different shape can be used. In the illustrated embodiment, the first and second fin mounting tabs 101, 102 are configured such that a central notch 107 is defined therebetween along the longitudinal axis LA. Each of the track support rails 70 is adapted to contactingly engaging the track assembly 45 such that the track assembly 45 is slidably movable over the respective track support rail 70.). In embodiments, at least one of the track support rails 70 can be configured to be mounted to one of the mounting fins 97, 99 in one of at least two mounting positions such that the ends of the track support rail 70 can be reversed in relation to its position on the associated mounting fin 97, 99.

Referring to FIG. 2, in the illustrated embodiment, each of the center sliders 55 includes a planar support surface 110 for slidably supporting the track assembly 45 that is substantially planar. The planar support surfaces 110 of the center sliders 55 are substantially aligned with each other along the vertical axis VA. In other embodiments, the upper support surface of the center sliders 55 can each have a convex curved shape, and, in embodiments, be arranged along the vertical axis VA such that the center slider 55 disposed in the middle of the three is vertically higher than the other two.

Referring to FIGS. 4-10, one of the end sliders 70 of the track support assembly 50 of FIG. 2 is shown removed from the support frame 75 of FIG. 2. The track support rail 70 is constructed according to one of several possible embodiments following principles of the present disclosure. The track support rail 70 is adapted to support the track assembly 45 of the machine 20 such that the track assembly 45 is slidably movable over the track support rail 70. It should be understood that the description of the track support rail 70 shown in FIGS. 4-10 is applicable to the other end slider 70, as well.

In embodiments, the track support rail 70 can be made from any suitable material, such as metal, for example, and can be made using any suitable technique, such as by being cast and machined to final dimensional tolerance, for example. In embodiments, the track support rail 70 can be made from a suitable steel, such as a manganese steel, for example.

Figure 4:
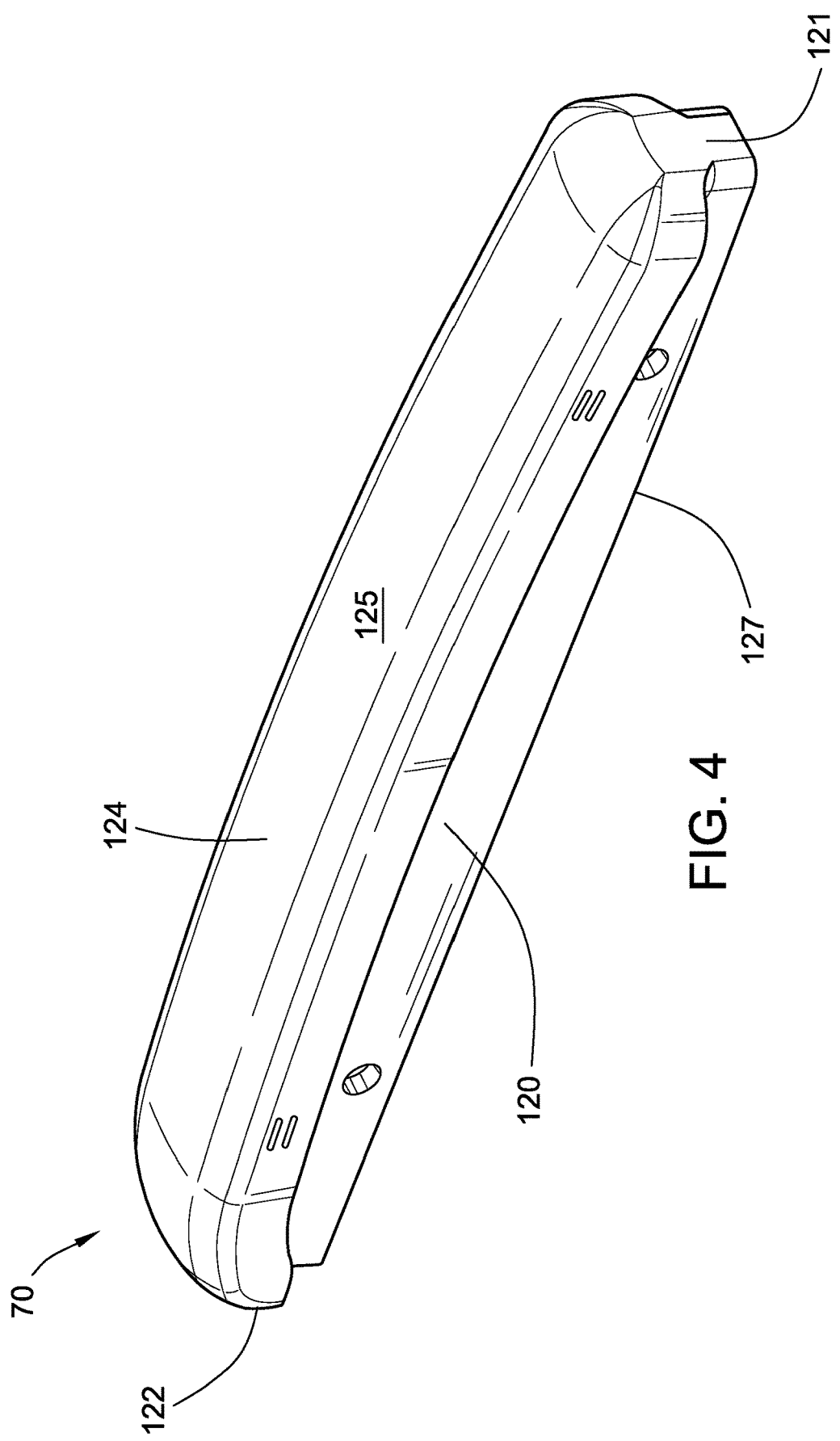
FIG. 4 is a perspective view of an embodiment of a track support rail, or slider, which is constructed in accordance with principles of the present disclosure and which is suitable for use in the track support assembly of FIG. 2.

Referring to FIGS. 4-7, the track support rail 70 includes a body 120 having a first body end 121, a second body end 122, a crown portion 124, an upper support surface 125, a bottom portion 127, and a mounting surface 129. Referring to FIG. 4, in embodiments, the body 120 has an asymmetric configuration such that there is an increased amount of wear material at one or more specific locations along the body 120 of the track support rail 70 at which increased wear (relative to at least one other location along the slider) is expected to occur based upon its intended use. For example, in embodiments, more wear of the end slider 70 is expected to occur at the end of the slider located closer to the idler end 84 of the support frame 75. As such, in embodiments, the second body end 122 of the end slider 70 can have a larger volume than the volume of the first body end 121 such that there is more wear material at the second body end 122 relative to the first body end 121. In the illustrated embodiment, the first body end 121 and the second body end 122 are asymmetric with respect to each other.

Figure 5:
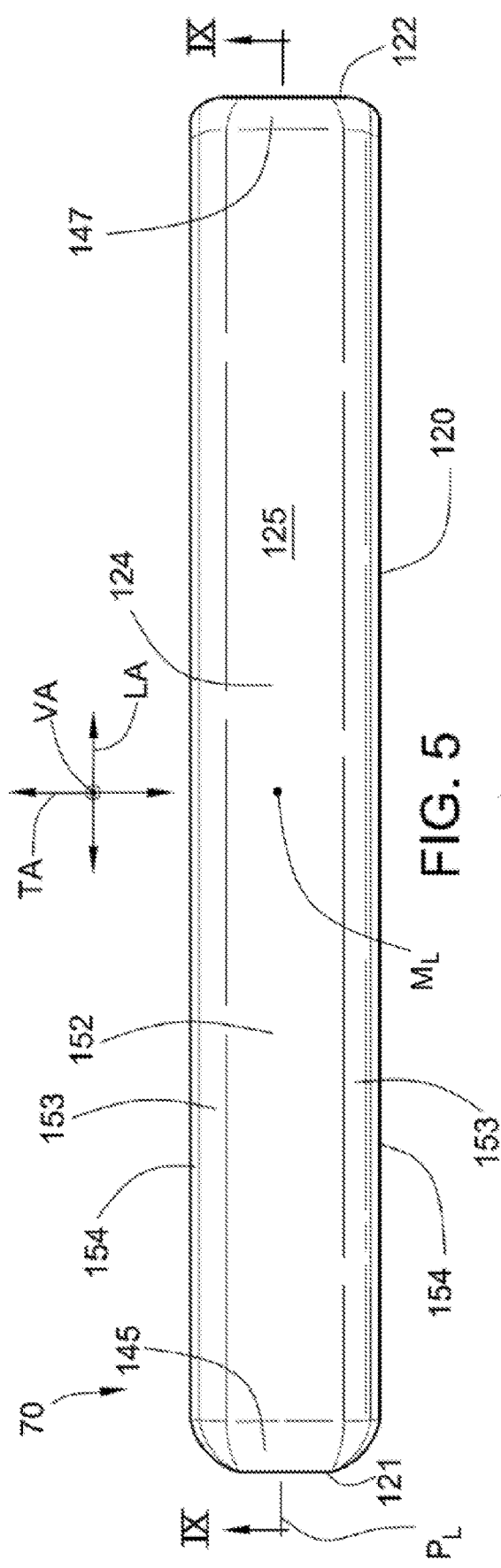
FIG. 5 is a top plan view of the slider of FIG. 4.
Figure 6:
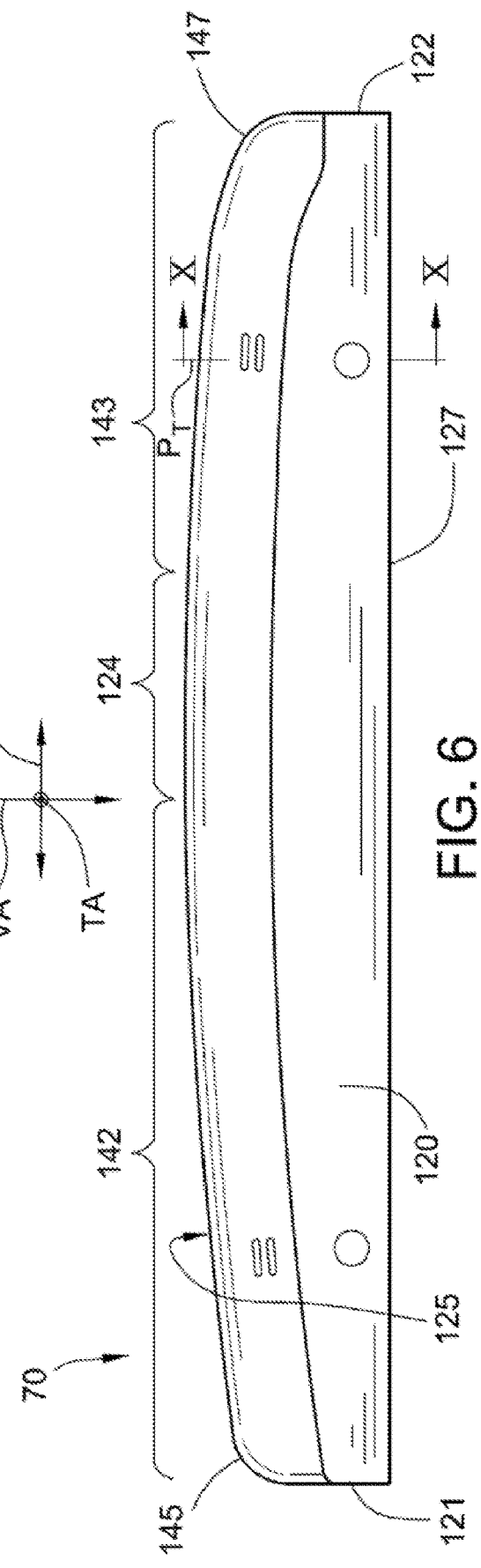
FIG. 6 is a side elevational view of the slider of FIG. 4.

Referring to FIGS. 5 and 6, the body 120 extends along the longitudinal axis between the first body end 121 and the second body end 122. The body 120 extends laterally along a transverse axis TA which is perpendicular to the longitudinal axis LA, and has a height measured along a vertical axis VA, which is perpendicular to both the longitudinal axis LA and the transverse axis TA. The crown portion 124 is disposed between the first body end 121 and the second body end 122 along the longitudinal axis LA. The upper support surface 125 extends along the longitudinal axis between the first body end 121 and the second body end 122. The upper support surface 125 is curved from the first body end 121 toward the crown portion 124 and from the second body end 122 toward the crown portion 124. The bottom portion 127 is in opposing relationship to the upper support surface 125. The mounting surface 129 extends inwardly from the bottom portion 127 of the body 120 and defines a mounting pocket 140 (see FIGS. 7 and 8).

Referring to FIG. 6, the crown portion 124 of the track support rail 70 comprises an intermediate portion of the body 120 including the maximum height of the body, which is measured along the vertical axis VA. In the illustrated embodiment, the crown portion 124 has a greater height than both the first body end 121 and the second body end 122.

In embodiments, the upper support surface 125 has a convex curved configuration. In the illustrated embodiment, the upper support surface 125 includes a first curved segment 142 and a second curved segment 143. The first curved segment 142 has a first curved shape and extends from the first body end 121 toward the crown portion 124 of the body 120. The second curved segment 143 has a second curved shape and extends from the second body end 122 toward the crown portion 124 of the body 120. The first curved shape of the first curved segment 142 is different from the second curved shape of the second curved segment 143. In the illustrated embodiment, the first curved segment 142 generally increases in height (measured along the vertical axis VA), moving along the longitudinal axis LA from the first body end 121 to the crown portion 124, and the second curved segment 143 generally increases in height (measured along the vertical axis VA), moving along the longitudinal axis LA from the second body end 122 to the crown portion 124.

The first curved segment 142 includes a first rounded corner 145, and the second curved segment 143 includes a second rounded corner 147. The first rounded corner 145 has a first corner shape, and the second rounded corner 147 has a second corner shape which is different from the first corner shape (see also, FIG. 5).

Referring to FIG. 9, the track support rail 70 is shown in section long a longitudinal plane $P_L$ extending through a lateral midpoint $M_L$ of the body 120 taken along the transverse axis TA (see also, FIG. 5). The longitudinal plane $P_L$ is defined by the longitudinal axis LA and the vertical axis VA. The upper support surface 125 includes a crown segment 150 disposed in overlying relationship with the crown portion 124 of the body 120. The first rounded corner 145 has a first radius of longitudinal curvature $R_{1L}$ in the longitudinal plane $P_L$. The second rounded corner 147 has a second radius of longitudinal curvature $R_{2L}$ in the longitudinal plane $P_L$. The crown segment 150 has a third radius of longitudinal curvature $R_{3L}$ in the longitudinal plane $P_L$. In embodiments, the third radius of longitudinal curvature $R_{3L}$ is different from both the first radius of longitudinal curvature $R_{1L}$ and the second radius of longitudinal curvature $R_{2L}$. In the illustrated embodiment, the third radius of longitudinal curvature $R_{3L}$ is greater than both the first radius of longitudinal curvature $R_{1L}$ and the second radius of longitudinal curvature $R_{2L}$.

In embodiments, the longitudinal curvature of the upper support surface 125 can be configured to generally approximate a projected arc that is tangent to the circumference of the idler sprocket 52. In embodiments, the longitudinal curvature of the upper support surface 125 can be configured to have the largest radius within the available space for the end slider 70 in its intended application, while still: allowing for sliding movement of the track assembly 45 along the top of the track support assembly 50 defined by the sliders 55, 70 and allowing sufficient slack in the track assembly 45 to prevent over tensioning when propelling the machine 20 over large obstacles.

Referring to FIG. 10, the upper support surface 125 can be configured to support the weight of the track assembly 45 with reduced wear. In embodiments, the curved configuration of the upper support surface 125 can be adapted to lower contact pressure exerted by the track assembly 45 over the width of the track support rail 70 (taken along the transverse axis TA). Referring to FIGS. 5 and 10, the upper support surface 125 can include a central strip 152, a pair of intermediate strips 153 flanking the central strip 152, and a pair of outer strips 155 disposed laterally outward of the intermediate strips 153. The strips 152, 153, 155 extend along the longitudinal axis LA between the first body end 121 and the second body end 122. In embodiments, the strips 152, 153, 155 are configured to blend together such that a significant discontinuity between adjacent strips 152, 153, 155 is avoided.

Referring to FIG. 10, in embodiments, the outer strips 155 can have a first radius of transverse curvature $R_{1T}$ in a transverse plane $P_T$ (see FIG. 6) defined by the transverse axis TA and the vertical axis VA, the intermediate strips 153 can have a second radius of transverse curvature $R_{2T}$ in the transverse plane $P_T$, and the central strip 152 can have a third radius of transverse curvature $R_{3T}$ in the transverse plane $P_T$. In embodiments, the third radius of transverse curvature $R_{3T}$ can be greater than both the second radius of transverse curvature $R_{2T}$ and the first radius of transverse curvature $R_{1T}$. In embodiments, the second radius of transverse curvature $R_{2T}$ can be greater than the first radius of transverse curvature $R_{1T}$. In the illustrated embodiment, the second radius of transverse curvature $R_{2T}$ is about four times greater than the first radius of transverse curvature $R_{1T}$, and the third radius of transverse curvature $R_{3T}$ is about three times greater than the second radius of transverse curvature $R_{2T}$.

Referring to FIG. 3, the body 120 of the track support rail 70 is mounted to the mounting fin 99 of the support frame 75. In embodiments, the body 120 of the track support rail 70 is mounted to the mounting fin 99 of the support frame such that at least a portion of the mounting fin 99 is disposed within the mounting pocket 140 of the track support rail. In the illustrated embodiment, portions of both the first mounting tab 101 and the second mounting tab 102 of the mounting fin 99 are disposed within the mounting pocket 140. The mounting surface 129 of the body 120 is configured to seat directly upon the mounting fin 99 to transfer the load that the track support rail 70 is bearing (as a result of the track assembly 45 slidingly moving over it) directly to the mounting fin 99 without subjecting the fasteners 104 to an excessive shear load.

Referring to FIGS. 7 and 8, in embodiments, the mounting surface 129 defines the mounting pocket 140 with a close fit such that the mounting fin to which the track support rail 70 is mounted is locked against the mounting surface 129 both longitudinally along the longitudinal axis LA and laterally along the transverse axis TA. In embodiments, the mounting surface 129 defines the mounting pocket 140 such that each of the fin portions 101, 102 (in the form of mounting tabs in the illustrated embodiment) positively contact the mounting surface 129 such that the load born by the track support rail 70 is transferred directly to the mounting fin to which the track support rail 70 is mounted.

The mounting surface 129 includes a pair of sidewalls 170 and a pair of end walls 172. The sidewalls 170 extend along the longitudinal axis LA and are in lateral spaced relationship to each other along the transverse axis TA. The end walls 172 extend along the transverse axis TA between the pair of sidewalls 170 and are in spaced relationship to each other along the longitudinal axis LA.

In embodiments, at least one of the pair of sidewalls 170 includes a sidewall rib 174 projecting therefrom. In embodiments, each sidewall rib 174 projects along the transverse axis TA toward the other of the pair of sidewalls 170. In the illustrated embodiment, each of the sidewalls 170 includes a plurality of sidewall ribs 174 projecting therefrom toward the other sidewall 170. In embodiments, at least one of the pair of end walls 172 includes an end wall rib 175 projecting therefrom toward the other of the pair of end walls 172. In the illustrated embodiment, both of the end walls 172 include an end wall rib 175 projecting therefrom. The end wall ribs 175 project toward each other along the longitudinal axis LA.

In embodiments, the sidewall ribs 174 and the end wall ribs 175 provide the contacting surfaces that contactingly engage the mounting fin to which the track support rail 70 is mounted. The sidewall ribs 174 can be provided to help facilitate the lateral engagement of the slider 70 with the mounting fin. The end wall ribs 175 can be provided to help provide an even more positive contacting engagement between the slider 70 and the mounting fin along the longitudinal axis LA. The sidewall ribs 174 and the end wall ribs 175 can be more readily machined to close tolerance than would be the case if the sidewalls 170 were planar. For example, in embodiments where the body 120 is made from manganese steel, the body can be difficult to machine. Providing the sidewall ribs 174 and/or the end wall ribs 175 can help achieve a close fit up between the track support rail 70 and the mounting fin to which it is mounted with a reduced amount of machining time.

In the illustrated embodiment, the mounting pocket includes a first pocket end segment 181 and a second pocket end segment 182. Each pocket end segment 181, 182 of the mounting pocket 140 is configured to contactingly engage one of the mounting tabs 101, 102 of a mounting fin of the support frame 75. In embodiments, the pocket end segments 181, 182 are configured such that they can be respectively mounted to either of the mounting tabs 101, 102 of a mounting fin such that the track support rail 70 can be mounted in one of two mounting positions upon the mounting fin.

The mounting pocket includes a pocket central segment 185 which is interposed between the first pocket end segment 181 and the second pocket end segment 182 along the longitudinal axis LA. In the illustrated embodiment, the pocket central segment 185 is configured such that the portion of the mounting surface 129 that defines the pocket central segment 185 is in non-contacting relationship with the mounting fin 99 when the mounting fin 99 is fully seated within the first and second pocket end segments (see also, FIG. 3).

Referring to FIG. 8, the second pocket end segment 182 is shown. The first pocket end segment 181 and the second pocket end segment 182 are mirror images of each other. Accordingly, it should be understood that the description of the second pocket end segment 182 is applicable to the first pocket end segment 181, as well.

The bottom portion 127 of the track support rail 70 defines a mounting pocket opening 188. The mounting pocket 140 extends inwardly from the mounting pocket opening 188 of the bottom portion 127. The mounting surface 129 of the track support rail 70 includes a seating surface 190. The seating surface 190 is in spaced relationship to the mounting pocket opening 188 along the vertical axis VA. The seating surface 190 extends laterally between the sidewalls 170 and forms a closed end of the mounting pocket 140. In embodiments, the mounting pocket is configured such that the mounting tabs 101, 102 of the mounting fin upon which the track support rail 70 is mounted is in contacting relationship with the seating surface 190.

In embodiments, the body 120 defines a pair of mounting holes 192. The pair of mounting holes 192 are aligned with each other to receive a fastener 104 therethrough. In embodiments, the pair of mounting holes 192 is in communication with the mounting pocket 140 via the pair of sidewalls 170, respectively. In embodiment, at least one of the pair of sidewalls 170 includes a pair of sidewall ribs 174 projecting therefrom and in flanking relationship to the one of the pair of mounting holes 192 associated therewith. In the illustrated embodiment, both of the mounting holes 192 are flanked by sidewall ribs 174.

In the illustrated embodiment, the pair of sidewalls 170 each includes a side base surface 194, and the sidewall ribs 174 project from the side base surface 194. The sidewall ribs 174 can be configured to project toward each other along the transverse axis TA such that the sidewall ribs 174 are in contacting relationship with the mounting fin of the support frame to constrain the mounting fin laterally along the transverse axis TA between the sidewall ribs 174, and the side base surfaces 194 are in non-contacting relationship with the mounting fin (see also, FIG. 7).

In the illustrated embodiment, each one of the pair of end walls 172 includes an end base surface 197, and the end wall rib 175 projects from the end base surface 191. Each end wall rib 175 is configured to project along the longitudinal axis LA toward the other of the pair of end walls 172 such that the end wall ribs 175 are in contacting relationship with the mounting fin of the support frame and the end base surfaces 197 are in non-contacting relationship with the mounting fin (see also, FIG. 7).

Referring to FIGS. 11 and 12, the body 120 of the track support rail 70 is mounted to the mounting fin 99 of the support frame such that the seating surface 190 of the mounting surface 129 is in contacting relationship with a top portion 198 of the mounting fin 99. The body 120 of the track support rail 70 is mounted to the mounting fin 99 of the support frame 75 such that the fin opening 105 is aligned with the pair of body mounting holes 192 of the track support rail.

Referring to FIG. 12, the fastener 104 extends through the pair of body mounting holes 192 and the fin opening 105 to connect the track support rail 70 to the mounting fin 99. The pair of body mounting holes 192 and the fin opening 105 are configured and arranged with respect to each other such that the fastener 104 is in non-contacting relationship with the mounting fin 99. Accordingly, the fastener 104 does not experience a significant shear load when the track support rail 70 is supporting the track assembly 45 as a result of the positional tolerance and size of the body mounting holes 192 and the fin opening 105.

In embodiments, the fastener 104 can include a threaded external surface and can be secured in place via a suitable nut 199, such as a jam nut, for example, having a mating internal threaded surface. In embodiments, once the nut 199 is secured to the fastener 104, it can be welded in place to enhance the secure retention of the track support rail 70 to the mounting fin 99.

Referring to FIGS. 13 and 14, the mounting surface 129 of the body 120 of the track support rail 70 is configured such that the body 120 is mountable to the mounting fin 99 in one of a first mounting position and a second mounting position. Referring to FIG. 13, the track support rail 70 is in the first mounting position. The first body end 121 being closer to the first fin portion 101 than the second body end 122 is when the body 120 is in the first mounting position. Referring to FIG. 14, the track support rail 70 is in the second mounting position. The second body end 122 is closer to the first fin portion 101 than the first body end 121 is when the body 120 is in the second mounting position. In embodiments, the mounting surface of the track support rail 70 can be configured such that its seating surfaces 190 can be placed in contacting engagement with either the first fin portion 101 or the second fin portion 102, depending upon in which mounting position the track support rail 70 is.

In embodiments of a method of using a track support assembly of a machine following principles of the present disclosure, a track support rail constructed according to principles of the present disclosure can have a reversible configuration to help extend its useful life. In at least some applications, the track support rail can experience more wear at either its leading end or trailing end (relative to the direction of sliding movement of the track assembly over the track support rail. In embodiments, during maintenance of the undercarriage, the mounting arrangement of the track support rail upon the support frame can be reversed in order to have the body end of the rail that has more material remaining placed in the location where the greater wear occurred. In embodiments, a method of using a track support assembly of a machine following principles of the present disclosure can be used with any embodiment of a track support rail constructed according to principles discussed herein.

Figure 15:
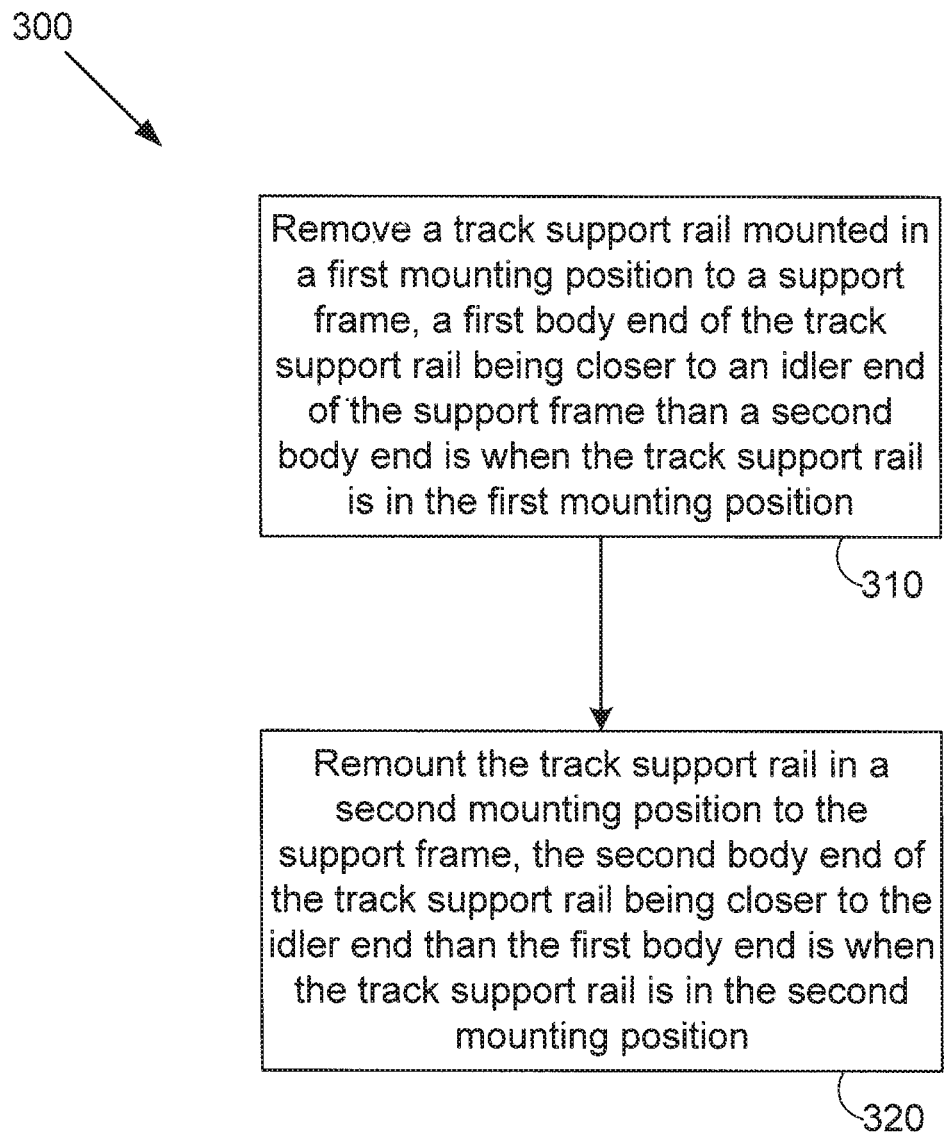
FIG. 15 is a flow chart illustrating steps of an embodiment of a method of using a track support assembly of a machine following principles of the present disclosure.

Referring to FIG. 15, in one embodiment of a method 300 of using a track support assembly of a machine following principles of the present disclosure, a track support rail mounted in a first mounting position to a support frame is removed (step 310). The support frame includes a drive end and an idler end. The support frame extends along a longitudinal axis between the drive end and the idler end. The track support rail includes a first body end and a second body end. The first body end of the track support rail is closer to the idler end than the second body end is when the track support rail is in the first mounting position.

The track support rail is remounted in a second mounting position to the support frame (step 320). The second body end of the track support rail is closer to the idler end than the first body end is when the track support rail is in the second mounting position.

In embodiments, the support frame includes a mounting fin projecting therefrom along a vertical axis which is perpendicular to the longitudinal axis. The mounting fin has a first fin portion and a second fin portion that is in spaced relationship to the first fin portion along the longitudinal axis. The track support rail is mounted to the mounting fin such that the first body end of the track support rail is closer to the first fin portion than the second body end is when the track support rail is in the first mounting position and such that the second body end of the track support rail is closer to the first fin portion than the first body end is when the track support rail is in the second mounting position.

INDUSTRIAL APPLICABILITY

The industrial applicability of the embodiments of a track support assembly and a track support rail described herein will be readily appreciated from the foregoing discussion. At least one embodiment of the disclosed track support rail may be used for a track support assembly. At least one embodiment of the disclosed track support rail can be used in an undercarriage of a track-type machine.

Embodiments of a track support rail constructed according to principles of the present disclosure can have an upper support surface that has a curved, asymmetric configuration. The track support rail can be readily mounted to a support frame without either constructing the track support rail as a unitary part of the support frame or welding the track support rail to the support frame.

In embodiments, a track support rail constructed according to principles of the present disclosure has a reversible mounting configuration that permits the track support rail to be mounted to a support frame in one of at least two different mounting positions. Reversing the track support rail after it has been subjected to a first wear period can help obtain an extended lifespan for the slider.

Embodiments of a track support rail and a track support assembly according to principles of the present disclosure may find potential application in any machine. Yet further, the present disclosure may be applicable to track-type undercarriages in which the components are subject to significant wear. Such machines may include, but are not limited to, excavators, which utilize a track-type undercarriage, or other mobile or stationary machines that utilize a track assembly, as described herein.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A track support rail for supporting a track assembly of a machine, the track assembly being slidably movable over the track support rail, the track support rail comprising:
a body, the body including a first body end, a second body end, a crown portion, and an upper support surface, the body extending along a longitudinal axis between the first body end and the second body end, the crown portion disposed between the first body end and the second body end along the longitudinal axis, and the upper support surface extending along the longitudinal axis between the first body end and the second body end, and the body including a bottom portion and a mounting surface, the bottom portion in opposing relationship to the upper support surface, the mounting surface extending from the bottom portion of the body and defining a mounting pocket, the mounting surface including a pair of sidewalls, the pair of sidewalls extending along the longitudinal axis and being in lateral spaced relationship to each other along a transverse axis, the transverse axis being perpendicular to the longitudinal axis;
wherein the upper support surface includes a first curved segment and a second curved segment, the first curved segment having a first curved shape and extending from the first body end toward the crown portion of the body, the second curved segment having a second curved shape and extending from the second body end toward the crown portion of the body, the first curved shape being different from the second curved shape.

2. The track support rail according to claim 1, wherein the first curved segment includes a first rounded corner, the second curved segment includes a second rounded corner, the first rounded corner has a first corner shape, and the second rounded corner has a second corner shape, the second corner shape being different from the first corner shape.

3. The track support rail according to claim 2, wherein the upper support surface includes a crown segment disposed in overlying relationship with the crown portion of the body, and wherein the first rounded corner has a first radius of longitudinal curvature in a longitudinal plane, the second rounded corner has a second radius of longitudinal curvature in the longitudinal plane, and the crown segment has a third radius of longitudinal curvature in the longitudinal plane, the longitudinal plane extending through a lateral midpoint of the body taken along a transverse axis, the transverse axis being perpendicular to the longitudinal axis, the longitudinal plane being defined by the longitudinal axis and a vertical axis, the vertical axis being perpendicular to both the longitudinal axis and the transverse axis, and the third radius of longitudinal curvature being different from both the first radius of longitudinal curvature and the second radius of longitudinal curvature.

4. The track support rail according to claim 3, wherein the third radius of longitudinal curvature is greater than both the first radius of longitudinal curvature and the second radius of longitudinal curvature.

5. The track support rail according to claim 1, wherein at least one of the pair of sidewalls of the mounting surface includes a sidewall rib projecting therefrom along the transverse axis toward the other of the pair of sidewalls.

6. The track support rail according to claim 1, wherein the mounting surface includes a pair of end walls, the pair of end walls extending along the transverse axis between the pair of sidewalls and being in spaced relationship to each other along the longitudinal axis, at least one of the pair of sidewalls and the pair of end walls including a rib projecting therefrom.

7. The track support rail according to claim 6, wherein the pair of sidewalls of the mounting surface each includes a sidewall rib projecting therefrom toward each other along the transverse axis, and the pair of end walls each includes an end wall rib projecting therefrom toward each other along the longitudinal axis.

8. The track support rail according to claim 7, wherein the body defines a pair of mounting holes, the pair of mounting holes being aligned with each other to receive a fastener therethrough, the pair of mounting holes being in communication with the mounting pocket, and at least one of the pair of sidewalls including a pair of sidewall ribs projecting therefrom, and one of the pair of mounting holes being interposed between the pair of sidewall ribs.

9. A track support assembly for supporting a track assembly of a machine, the track support assembly comprising:
a support frame, the support frame including a drive end and an idler end, the support frame extending along a longitudinal axis between the drive end and the idler end, the support frame including a mounting fin projecting therefrom along a vertical axis, the vertical axis being perpendicular to the longitudinal axis;
a track support rail for contactingly engaging the track assembly such that the track assembly is slidably movable over the track support rail, the track support rail including:
a body, the body including a first body end, a second body end, a crown portion, and an upper support surface, the body extending along the longitudinal axis between the first body end and the second body end, the crown portion disposed between the first body end and the second body end along the longitudinal axis, and the upper support surface extending along the longitudinal axis between the first body end and the second body end, the body including a bottom portion and a mounting surface, the bottom portion in opposing relationship to the upper support surface, the mounting surface extending from the bottom portion of the body and defining a mounting pocket, the body of the track support rail being mounted to the mounting fin of the support frame such that at least a portion of the mounting fin is disposed within the mounting pocket of the track support rail, and
wherein the upper support surface is curved from the first body end toward the crown portion and from the second body end toward the crown portion, and wherein the first body end and the second body end are asymmetric with respect to each other.

10. The track support assembly according to claim 9, wherein the upper support surface of the track support rail includes a first curved segment and a second curved segment, the first curved segment extending from the first body end toward the crown portion of the body, the second curved segment extending from the second body end toward the crown portion of the body, and wherein the first curved segment has a first curved shape and the second curved segment has a second curved shape, the first curved shape being different from the second curved shape.

11. The track support assembly according to claim 9, wherein the mounting fin of the support frame has a first fin portion and a second fin portion, the second fin portion being in spaced relationship to the first fin portion along the longitudinal axis, and wherein the mounting surface of the body of the track support rail is configured such that the body is mountable to the mounting fin in one of a first mounting position and a second mounting position, the first body end being closer to the first fin portion than the second body end is when the body is in the first mounting position, and the second body end being closer to the first fin portion than the first body end is when the body is in the second mounting position.

12. The track support assembly according to claim 9, wherein the mounting surface of the track support rail includes a pair of sidewalls, the pair of sidewalls extending along the longitudinal axis and being in lateral spaced relationship to each other along a transverse axis, the transverse axis being perpendicular to the longitudinal axis, at least one of the pair of sidewalls including a side base surface and a sidewall rib projecting from the side base surface along the transverse axis toward the other of the pair of sidewalls such that said sidewall rib is in contacting relationship with the mounting fin of the support frame and said side base surface is in non-contacting relationship with the mounting fin.

13. The track support assembly according to claim 9, wherein the mounting surface of the track support rail includes a pair of sidewalls and a pair of end walls, the pair of sidewalls extending along the longitudinal axis and being in lateral spaced relationship to each other along a transverse axis, the transverse axis being perpendicular to the longitudinal axis, the pair of end walls extending along the transverse axis between the pair of sidewalls and being in spaced relationship to each other along the longitudinal axis, at least one of the pair of end walls including an end base surface and an end wall rib projecting from the end base surface along the longitudinal axis toward the other of the pair of end walls such that said end wall rib is in contacting relationship with the mounting fin of the support frame and said end base surface is in non-contacting relationship with the mounting fin.

14. The track support assembly according to claim 9, wherein the mounting surface of the track support rail includes a pair of sidewalls and a pair of end walls, the pair of sidewalls extending along the longitudinal axis and being in lateral spaced relationship to each other along a transverse axis, the transverse axis being perpendicular to the longitudinal axis, the pair of end walls extending along the transverse axis between the pair of sidewalls and being in spaced relationship to each other along the longitudinal axis, the pair of sidewalls each including a side base surface and a sidewall rib projecting from the side base surface toward each other along the transverse axis such that the sidewall rib of each of the pair of sidewalls is in contacting relationship with the mounting fin of the support frame to constrain the mounting fin laterally along the transverse axis between the sidewall rib of both of the pair of sidewalls, the side base surface of each of the pair of sidewalls is in non-contacting relationship with the mounting fin, the pair of end walls each including an end base surface and an end wall rib projecting from the end base surface, the end wall rib of each of the pair of end walls projecting toward each other along the longitudinal axis such that the end wall rib of each of the pair of end walls is in contacting relationship with the mounting fin of the support frame to constrain the mounting fin longitudinally along the longitudinal axis between the end wall rib of both of the pair of end walls, and the end base surface of each of the pair of end walls is in non-contacting relationship with the mounting fin.

15. The track support assembly according to claim 9, wherein the bottom portion of the track support rail defines a mounting pocket opening, the mounting pocket extending inwardly from the mounting pocket opening of the bottom portion, and the mounting surface of the track support rail includes a seating surface, the seating surface being in spaced relationship to the mounting pocket opening along the vertical axis, the body of the track support rail being mounted to the mounting fin of the support frame such that the seating surface of the mounting surface is in contacting relationship with a top portion of the mounting fin.

16. The track support assembly according to claim 15, wherein the body of the track support rail defines a pair of body mounting holes, the pair of body mounting holes being aligned with each other, the pair of body mounting holes being in communication with the mounting pocket, the mounting fin defines a fin opening, and the body of the track support rail is mounted to the mounting fin of the support frame such that the fin opening is aligned with the pair of body mounting holes of the track support rail, the track support assembly further comprising:

a fastener, the fastener extending through the pair of body mounting holes and the fin opening to connect the track support rail to the mounting fin;

wherein the pair of body mounting holes and the fin opening are configured and arranged with respect to each other such that the fastener is in non-contacting relationship with the mounting fin.

17. A method of using a track support assembly of a machine, the method comprising:

removing a track support rail mounted in a first mounting position to a support frame, the support frame including a drive end and an idler end, the support frame extending along a longitudinal axis between the drive end and the idler end, and the track support rail including a first body end and a second body end, the first body end of the track support rail being closer to the idler end than the second body end is when the track support rail is in the first mounting position;

remounting the track support rail in a second mounting position to the support frame, the second body end of the track support rail being closer to the idler end than the first body end is when the track support rail is in the second mounting position.

18. The method according to claim 17, wherein the support frame includes a mounting fin projecting therefrom along a vertical axis, the vertical axis being perpendicular to the longitudinal axis, the mounting fin having a first fin portion and a second fin portion, the second fin portion being in spaced relationship to the first fin portion along the longitudinal axis, and wherein the track support rail is mounted to the mounting fin such that the first body end of the track support rail is closer to the first fin portion than the second body end is when the track support rail is in the first mounting position and such that the second body end of the track support rail is closer to the first fin portion than the first body end is when the track support rail is in the second mounting position.

* * * * *